Sept. 28, 1948.  P. W. THORNHILL  2,450,387
PNEUMATIC SHOCK ABSORBER
Filed May 8, 1946
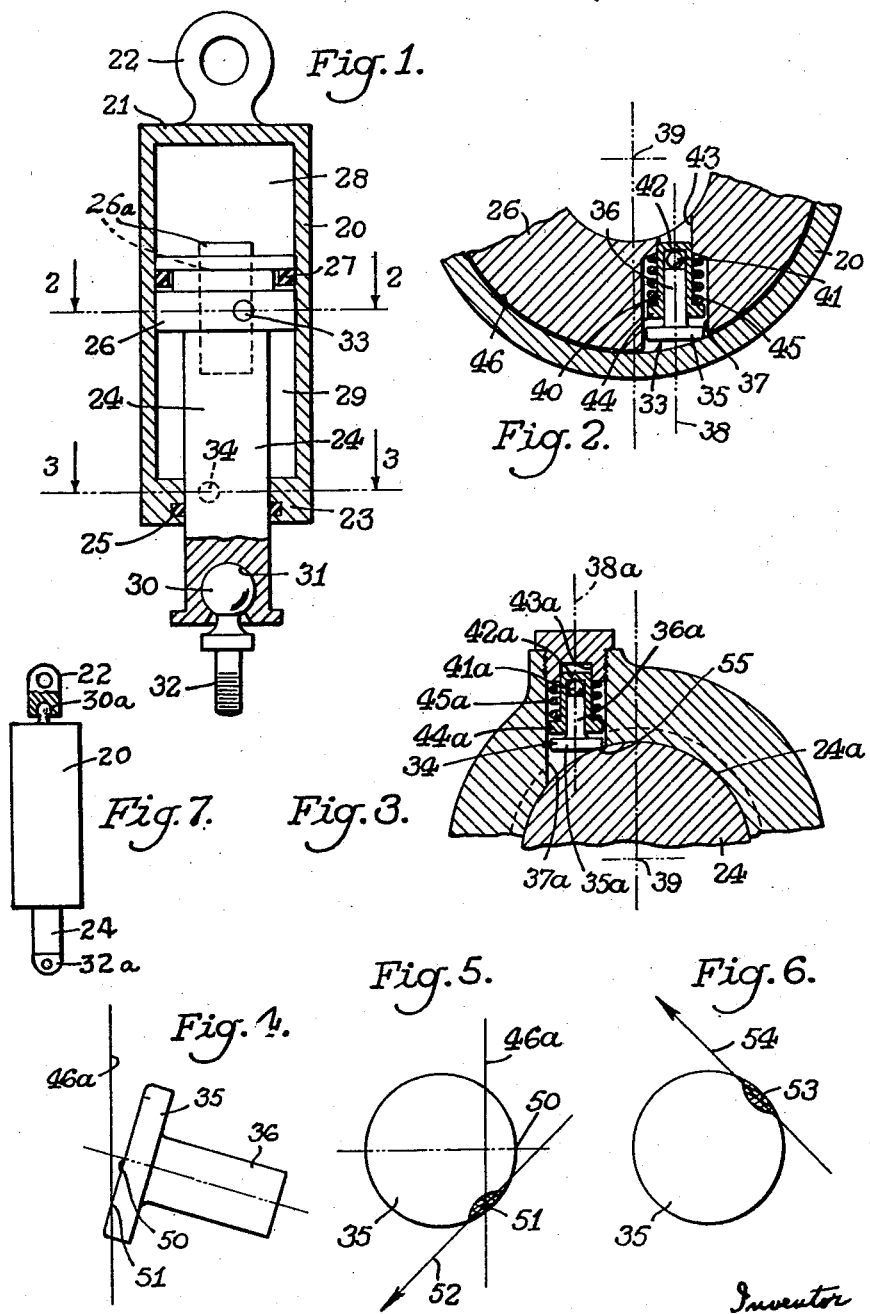

Patented Sept. 28, 1948

2,450,387

UNITED STATES PATENT OFFICE 2,450,387

PNEUMATIC SHOCK ABSORBER

Peter Warborn Thornhill, Leamington Spa, England, assignor to The Ribbesford Company Limited, Leamington Spa, England Application May 8, 1946, Serial No. 668,285
In Great Britain June 15, 1945

9 Claims. (Cl. 188—88)

This invention relates to shock absorbers of the fluid pressure cylinder and piston type. Such shock absorbers may have a piston with packing means sliding longitudinally within a cylinder, or else (or in addition) a cylindrical plunger or piston rod which slides within an annular packing, and in the present specification the cylinder and piston (or plunger and packing), are herein termed the relatively sliding elements.

It is the object of the invention to provide an improved construction of shock absorber which is arranged with a view to securing a long working life for the usual piston and/or plunger packing means.

It has been found that in piston and cylinder shock absorbers, the surfaces of the relatively sliding elements tend to become scored, producing in time longitudinal furrows or grooves which substantially reduce the efficiency of the fluid tight packing means. The invention sets out to avoid this difficulty.

According to the invention, in a shock absorber of the fluid pressure cylinder and piston type, means are provided for generating, from the reciprocation of the parts, rotation of the relatively sliding elements, which rotation is uni-directional. Preferably the piston is mounted so as to be free to rotate about its axis, although in some cases the requisite relative rotation may be obtained by allowing the cylinder to turn about its axis.

The invention is illustrated by way of example in the accompanying diagrammatic drawings, in which—

Figure 1 is a sectional elevation of a pneumatic shock absorbing suspension unit incorporating one form of rotation-producing means;

Figure 2 is a fragmentary sectional plan taken on the line 2—2 of Figure 1 and drawn to an enlarged scale;

Figure 3 is a similar sectional view, taken on the line 3—3 of Figure 1;

Figures 4, 5 and 6 are diagrams to show the action of the rotary pads in Figures 1, 2 and 3; and Figure 7 is a side elevation of a modified unit.

The telescopic shock absorbing suspension units shown in the drawings are of the pneumatic type, such for instance as is described in our British Patent specification No. 570,813, in which compressed air is utilised both as a spring and as a movement-damping medium. It will be understood however that the invention is equally applicable to other telescopic fluid-pressure shock absorbers and/or suspension devices, such as those which employ a quantity of liquid as the damping means. Suspension devices of this form and the manner in which they operate are described in our above mentioned patent specification.

The device shown diagrammatically in Figure 1 comprises a cylinder 20, closed at its upper end by a wall 21, and provided with a fixing lug 22 enabling it to be secured, say to the chassis frame or body (not shown) of the vehicle. The lower end of the cylinder 20 has an internal collar 23 within which a plunger 24 fits slidably, a packing device 25 being provided to prevent the escape of pressure fluid along the surface of the plunger 24. A piston 26 is slidable within the cylinder 20 and is formed with a peripheral groove containing a packing ring 27. The piston 26 divides the interior of the cylinder 20 into two working spaces 28 and 29, these being connected together by, and under the control of, a damping valve device indicated at 26a. This forms no part of the invention, but it can conveniently be of a form described in our British Patent specification No. 570,813. As the working spaces 28 and 29 are charged with air under pressure, there is of course always a force on the piston 26 tending to extend the unit and resist the axial load, this force being due to the cross sectional area occupied by the plunger member 24. The plunger 24 is connected with the wheel axle or equivalent (not shown) by a universal joint comprising a ball member 30 slidable within a spherical socket 31 in the lower end of the plunger member 24, the ball member 30 having a screw-threaded stem 32 for attachment purposes. The ball and socket joint 30, 31 enables the plunger 24 to swing about its lower end, but its main purpose is to allow said plunger 24 and piston 26 to rotate bodily about the longitudinal axis of the unit so as to distribute the wear of the sealing rings 25 and 27, and the surfaces against which they slide, and thus prevent them from becoming scored.

This rotation is generated by the natural reciprocation of the suspension device during riding, one or more rotary pad devices being provided for this purpose; two such pad devices are shown in Figure 1, namely, a rotary pad device 33 in the piston 26, and a rotary pad device 34 fitted into the collar 23 of the cylinder 20. The construction of the pad device 33 is shown in Figure 2. It comprises a rotary pad member of mushroom shape having a flat circular head 35 and a stem 36. The piston 26 is formed with a cylindrical recess 37, the axis 38 of which is offset from the longitudinal axis 39 of the unit although it extends truly horizontal, i. e. in a transverse plane at right angles to the axis 39. A bearing member 40 receives the stem 36 snugly, the end of the stem resting against a ball 41 which is supported by the closed end 42 of the bearing member 40 and thus acts as a thrust member. This inner end part of the bearing member is located in a constricted portion 43 at the inner end of the recess 37, although its outer end is provided with a circumferential flange 44 which has appreciable clearance within the recess 37 so as to allow the bearing member 40 to tilt to a predetermined extent. A coiled compression spring 45, disposed within the recess 37, acts upon the flange 44 and thus urges the head 35 constantly against the internal surface 46 of the cylinder 20. Owing to the offset position of the axis 38, however, the head 35 engages obliquely with the cylinder wall 46 and has only a single "point" or localised area of contact, this being on the right hand side as seen in Figure 2. Therefore as the piston 26 reciprocates within the cylinder 20, the pad member 35, 36 rotates backwards and forwards within the bearing member 40, its head rolling upon the cylinder wall 46. At the same time, however, there is a certain amount of frictional drag and this causes the pad member to have its head 35 inclined upwards during downward strokes of the piston 26 and inclined downward during upward strokes. The effect of this is seen in Figures 4, 5 and 6, in which the inclination has been considerably exaggerated so as to make the action clear. Figures 4 and 5 relate to the downward stroke of the piston 26. As a result of the above-mentioned drag and the clearance around the flange 44 of the bearing member 40, the pad member 35, 36 assumes an inclined position and causes the "point" of contact with the cylinder wall 46 to move from the extreme right-hand position 50 to a lower position 51; a vertical line 46a has been drawn through the centre of contact and parallel with the cylinder axis 39. The head 35, in moving down the cylinder 20, tends to roll along the path indicated at 52, this being a tangent at the "point" of contact 51, so that in effect the head 35 takes a helical path, the piston 26 turning in a clockwise direction (seen from the top) as it moves downwards. During strokes in an upward direction the inclination of the pad member 35, 36 is reversed so that the "point" of contact rises, say to the position 53 shown in Figure 6; this causes the head 35 to roll along an oblique path 54, and again it generates clockwise rotation of the piston 26.

The rotary pad device 34 is the same in construction and action as the device 33, and a detailed description is therefore unnecessary. The parts are indicated by the same reference numerals with the addition of the suffix a. It will be seen that the head 35a bears inwards against the outer surface 24a of the plunger 24, the "point" of contact 55 being one-sided owing to the fact that the axis 38a is offset with respect to the plunger axis 39. As the plunger 24 moves downwards, the head 35a is dragged downwards, thus raising the "point" of contact 55 so that the clockwise rotation of the head 35a (seen from the front, as in Figure 1) is accompanied by a clockwise rotation of the plunger (seen from above, as in Figure 3); similarly upward movement of the plunger 24 causes the head 35a to be raised, and the "point" of contact thereon lowered, so that anti-clockwise rotation of the head 35a also produces clockwise rotation of the plunger member 24. During running, the stroke of the suspension device is continually changing, so that there is no chance of any given point on the piston 26 moving repeatedly along a definite helical path to an extent sufficient to produce scoring of the rubbing surfaces.

The construction of the unit shown in Figure 7 is the same as described above, except that a ball and socket swivelling connection 30a is provided between the lug 22 and the cylinder 20 so as to allow said cylinder to rotate, the attachment means for the non-rotating plunger 24 comprising a simple lug 32a.

It will be understood that the arrangements which have been described are given only as examples of the invention and that other means may be used for bringing about rotation of the piston or plunger of a shock absorber automatically as said piston or plunger reciprocates.

What I claim is:

1. A shock absorber of the fluid pressure piston and cylinder type, comprising a pair of relatively reciprocating elements, namely, a cylinder and piston, a pair of attachment devices for said elements, a swivel connection in one of the attachment devices permitting the corresponding element to rotate about its axis relative to the other element, and rotating means for producing from the relative reciprocation of the elements rotation of that element having the swivel connection, said rotating means comprising a housing in one element, a rotary pad member mounted in said housing, and resilient means urging the rotary pad member radially into frictional engagement with a cylindrical surface of the other element, the said cylindrical surface being engaged by a part of the rotary pad member displaced from the axis of said pad member, so that as the elements move telescopically, the rotary pad member tends to roll along a helical path on the said cylindrical surface and causes rotation of one of the elements relative to the other, about its axis.

2. A shock absorber as claimed in claim 1, in which the rotary pad member is free to rock as the direction of relative axial movement of the elements changes, whereby parts of the rotary pad member on opposite sides of the axis thereof engage alternately with the cylindrical surface during alternate strokes of the shock absorber, thus reversing the obliquity of the helical path and causing progressive uni-directional rotational movement of the elements as the latter reciprocate.

3. A shock absorber of the fluid pressure piston and cylinder type, comprising a pair of relatively reciprocating elements, namely a cylinder and piston, a pair of attachment devices for said elements, a swivel connection in one of the attachment devices for permitting the corresponding element to rotate about its axis relative to the other element, and rotating means for producing from the relative reciprocation of the elements rotation of that element having the swivel connection, said rotating means comprising a housing in one element, a bearing member rockably mounted in said housing, a mushroom-shaped rotary pad member having its stem rotatable in said bearing, and resilient means urging the rotary pad member into engagement with a cylindrical surface of the other element, the said cylindrical surface being engaged by a part of the rotary pad member displaced from the axis of said pad member, so that as the elements move telescopically, the rotary pad member tends to roll along a helical path on the said cylindrical surface and causes rotation of one of the elements relative to the other, about its axis.

4. A shock absorber as claimed in claim 3, having an axial thrust bearing between the stem of the rotary pad member and the bearing member, the resilient means acting between the housing and the bearing member to urge the rotary pad member into engagement with the said cylindrical surface.

5. A shock absorber as claimed in claim 4, wherein the bearing member is cup-shaped and the thrust bearing comprises a ball interposed between the bottom of the bearing member and the free end of the stem of the rotary pad member.

6. A shock absorber as claimed in claim 5, wherein the bearing member has a bottom portion fitting into a central recess in the housing, while the rim of the bearing member has clearance within the housing to permit the bearing member and rotary pad member to rock through a predetermined small angle as the elements reciprocate.

7. A shock absorber as claimed in claim 6, wherein the rim of the bearing member comprises an outwardly extending flange, and the resilient means comprise a coiled compression spring engaging said flange, said spring being disposed around the bearing member and abutting at its other end against the housing.

8. A shock absorber of the fluid pressure piston and cylinder type, comprising a pair of relatively reciprocating elements, namely a cylinder and piston, a pair of attachment devices for said elements, a swivel connection in one of the attachment devices permitting the corresponding element to rotate about its axis relative to the other element, and rotating means for producing from the relative reciprocation of the elements rotation of that element having the swivel connection, said rotating means comprising a housing recess in one of the elements extending towards the other element and having its open end always closed by a cylindrical surface on the said other element, the axis of the housing recess being disposed in a plane transverse to the common axis of the elements, but being offset with respect to said axis, a rotary pad member rockably fitted within said housing recess so as to engage the said cylindrical surface, and resilient means urging the rotary pad member into frictional engagement with said cylindrical surface, the pad member bearing against the cylindrical surface obliquely due to the offset position of the housing and thus causing the elements to rotate relatively as they reciprocate.

9. A shock absorber of the fluid pressure piston and cylinder type, comprising a pair of relatively reciprocating elements, namely a cylinder and piston, a pair of attachment devices for said elements, a swivel connection in one of the attachment devices permitting the corresponding element to rotate about its axis relative to the other element, and rotating means for producing from the relative reciprocation of the elements rotation of that element having the swivel connection, said rotating means comprising a pad member mounted rotatably in one of the elements about an axis which lies in a substantially transverse plane and is offset from the common axis of the elements, a cylindrical surface on the other of said elements, a circular end surface on said pad member which engages obliquely against the rolls frictionally upon the cylindrical surface, and resilient means urging the pad member into engagement with the cylindrical surface, the pad member taking a substantially helical path on said cylindrical surface and causing relative rotation of the elements as the latter reciprocate.

PETER WARBORN THORNHILL.

REFERENCES CITED

The following references are of record in the file of this patent:

UNITED STATES PATENTS

| Number | Name | Date |
| --- | --- | --- |
| 630,977 | Emgarth | Aug. 15, 1899 |
| 1,228,496 | Turner | June 5, 1917 |
| 1,283,675 | Coleman | Nov. 5, 1918 |
| 1,338,118 | Briggs | Apr. 27, 1920 |
| 1,501,758 | Drees | July 15, 1924 |
| 1,567,515 | Kijima et al | Dec. 29, 1925 |
| 2,083,020 | High | June 8, 1937 |
| 2,349,346 | Goepfrich | May 23, 1944 |
| 2,410,958 | Brockhurst | Nov. 12, 1946 |